United States Patent [19]
Barnett et al.

[11] 3,924,955
[45] Dec. 9, 1975

[54] SELF-RETAINING WASHER

[75] Inventors: Barry Roger Michael Barnett; Arthur William Burton, both of West Drayton, England

[73] Assignee: TRW Inc., Cleveland, Ohio

[22] Filed: July 17, 1974

[21] Appl. No.: 489,244

[30] Foreign Application Priority Data
July 23, 1973 United Kingdom............... 35049/73

[52] U.S. Cl.................................... 403/230; 85/36
[51] Int. Cl.²............................................ F16B 9/00
[58] Field of Search .............. 16/108, 109; 251/357; 29/277; 135/154; 138/96; 174/82; 226/196; 403/344, 252, 372, 255, 230; 85/8.8, 36; 151/38; 123/90.67

[56] References Cited
UNITED STATES PATENTS

| | | | |
|---|---|---|---|
| 972,434 | 10/1910 | Blomberg | 123/90.67 |
| 1,467,938 | 9/1923 | Janette | 403/252 |
| 1,899,715 | 2/1933 | Olson | 85/36 UX |
| 2,950,937 | 8/1960 | Bedford | 403/372 |
| 3,007,726 | 11/1961 | Parkin | 85/36 X |

*Primary Examiner*—Thomas F. Callaghan
*Assistant Examiner*—Wayne L. Shedd
*Attorney, Agent, or Firm*—James R. O'Connor

[57] ABSTRACT

A washer having a base portion divided by a plurality of radially extending slots into a plurality of radially arranged tongues. The tongues have end edges which define the internal circumference of the washer. The washer has an annular flange around the outer circumference of the base portion and the annular flange is divided by a plurality of slits. Each slit in the flange extends into a tongue of the base portion and the slots which define the radially arranged tongues extend into the flange. The arrangement is such that the tongues can be moved radially outwardly so as to increase the diameter of the internal circumference of the washer by expanding the flange. Thus each slit in the flange is opened and the tongues drawn radially outwardly.

2 Claims, 4 Drawing Figures

SELF-RETAINING WASHER

BACKGROUND OF THE INVENTION

The present invention relates to a washer having a base portion with an aperture and an annular flange around the outer periphery of the base portion.

There is a need, particularly in the automobile industry for such a washer which is capable of expanding so as to increase the diameter of the aperture.

It is an object of the present invention to provide such a washer.

STATEMENT OF THE INVENTION

According to one aspect of the present invention there is provided a washer comprising a base portion which is divided by a plurality of radially extending slots into a plurality of radially arranged tongues having end edges which define the internal circumference of the washer, and an annular flange around the outer circumference of the base portion, the annular flange being divided by a plurality of slits each of which extends into a tongue of the base portion, and the slots extending into the flange, the arrangement being such that the tongues can be moved radially outwardly to increase the diameter of the internal circumference of the washer by expanding the flange and thereby opening each slit in the flange to draw the tongues radially outwardly.

Preferably, the tongues which form the base portion of the washer include end portions which are inclined away from the plane of the base portion in the same direction as the flange which preferably extends generally at right-angles to the remainder of the base portion.

According to a second aspect the invention provides a washer as defined in the second paragraph above and a cylindrical member, the washer comprising a base portion divided by a plurality of radially extending slots into a plurality of radially arranged tongues having end edges which define the internal circumference of the washer, and an annular flange around the outer circumference of the base portion, the annular flange being divided by a plurality of slits each of which extends into a tongue of the base portion, and the slots extending into the flange, the external diameter of the cylindrical member being substantially greater than the internal diameter of the washer when unstressed, and in which the end edges of said tongues are engaged in a circumferential groove in said cylindrical member.

DETAILED DESCRIPTION OF THE PREFERRED EMBODIMENTS

Figure 1:
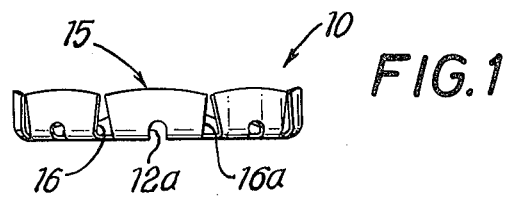
FIG. 1 is an elevation of a washer according to the present invention.
Figure 2:
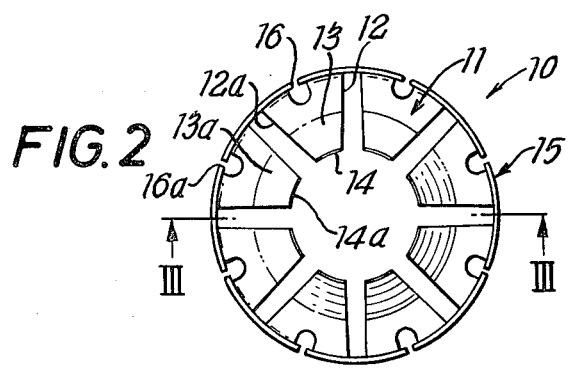
FIG. 2 is a plan view of the washer shown in FIG. 1.
Figure 3:
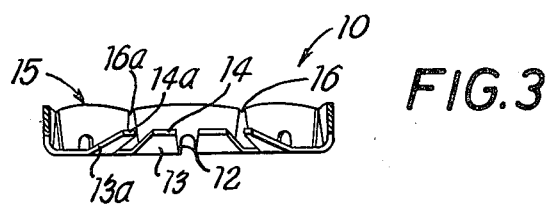
FIG. 3 is a section taken on the line III — III of FIG. 2.

In FIGS. 1 to 3 a washer is indicated generally at 10 which is formed from sheet metal and which is rendered resilient and preferably rust-proof during manufacture.

The washer 10 comprises an annular base portion 11 which is divided by a plurality of radially extending slots 12, 12a etc., to form a plurality of radially extending tongues 13, 13a etc.

Each tongue tapers towards the centre of the washer 10 and includes an arcuate end edge 14, 14a etc., the end edges 14, 14a defining the internal circumference of the washer 10.

A raised flange 15 defines the outer circumference of the washer 10, the flange 15 being divided by a plurality of slits 16, 16a. Each slit 16, 16a extends into a tongue 13, 13a etc.

Each of the tongues 13, 13a is bent upwardly so that the end portions of the tongues form a frustoconical portion and each of the slots 12, 12a in the base portion 11 extends a short distance into the flange 15.

Figure 4:
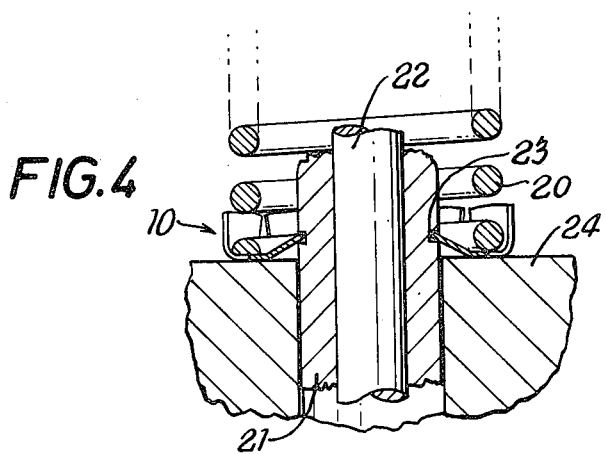
FIG. 4 is an elevation partly in section showing a coil spring located in position around a valve stem sleeve with the aid of the washer of FIGS. 1 to 3.

The washer 10 can be usefully employed, as shown in FIG. 4 to locate an end of a coil spring 20 in position around a sleeve 21 for a valve stem 22 of an internal combustion engine.

The washer 10 is mounted over the sleeve 21 with the ends of the tongues 13, 13a located in a groove 23 in the sleeve 21 and with the base portion 11 of the washer seated on a part 24 of the cylinder block. The end of the coil spring 20 is located within the flange 15 resting on the base portion 11. The resilience in the tongues 13, 13a is such that a limited amount of axial play in the sleeve 21 is permissible relative to the block 24.

In order to assemble the washer 10 on the sleeve 21, the washer is forced over the sleeve 21 until the tongues 13, 13a spring into the groove 23. The external diameter of the sleeve 21 is substantially greater than the internal circumference of the washer 10 when the washer is unstressed, and in order to force the washer over the sleeve 21 the internal circumference of the washer must be expanded radially outwardly to a substantial extent.

The presence of the raised flange 15 would normally render the washer 10 extremely stiff and resistant to radial expansion. However, by virtue of the slits in the flange 15 of the washer 10, each of which extends into a tongue 13, 13a the tongues can be readily expanded radially outwardly by spreading each slit 16, 16a in the flange so as to draw the associated tongue radially outwardly.

The washer 10 can thus be readily expanded and forced over the sleeve 21 to enable the tongues 13, 13a to drop into position in the groove 23. Thereafter the tongues 13, 13a retain the washer 10 in position on the sleeve 21 and the flange 15 provides a substantially firm secure location for the end of the coil spring 20 preventing any substantial lateral movement of the coil spring relative to the sleeve 21.

At the same time, the resilience in the tongues 13, 13a allows for a limited amount of play in the sleeve 21 relative to the block 24.

It will be appreciated that the resilience of the washer 10 and the facility with which the internal circumference of the washer can be expanded radially outwardly is achieved by the slits formed in the flange 15 each of which extends into a tongue 13, 13a enabling the tongue to be drawn radially outwardly as the associated slit in the flange is opened.

The washer 10 is particularly useful in the assembly described and illustrated with reference to FIG. 4, but it will be appreciated that the washer 10 can be used in any situation where it is necessary to expand the internal circumference of the washer to a substantial extent during the assembly of the washer on a cylindrical member.

In the embodiment described above the end portions of the tongues 13, 13a are bent upwardly so as to form a frusto-conical portion. It will be appreciated that the ends of the tongues need not be bent upwardly. The tongues could lie in a single plane. The slits 16 in the flange would enable the washer to expand.

We claim:

1. A washer comprising a base portion divided by a plurality of radially extending slots into a plurality of radially arranged tongues having end edges which define the internal circumference of the washer, and an annular flange around the outer circumference of the base portion, the annular flange extending from the base portion at substantially right angles thereto and being divided by a plurality of slits each of which extends into a tongue of the base portion, each of the tongues having an end portion which is inclined away from the plane of the remainder of the tongue so as to extend outwardly therefrom in the same general direction as the flange, and the slots extending into the flange, the arrangement being such that the tongues can be moved radially outwardly to increase the diameter of the internal circumference of the washer by expanding the flange and thereby opening each slit in the flange to draw the tongues radially outwardly.

2. The washer of claim 1 wherein said tongues each taper towards the inner circumference of the washer.

* * * * *